United States Patent
Matson et al.

(10) Patent No.: US 9,812,118 B2
(45) Date of Patent: Nov. 7, 2017

(54) MARINE MULTIBEAM SONAR DEVICE

(71) Applicant: Garmin Switzerland GmbH, Schaffhausen (CH)

(72) Inventors: John A. Matson, Broken Arrow, OK (US); Brian T. Maguire, Bixby, OK (US); Aaron R. Coleman, Broken Arrow, OK (US); Jeffrey W. Hanoch, Broken Arrow, OK (US)

(73) Assignee: Garmin Switzerland GmbH (CH)

( * ) Notice: Subject to any disclaimer, the term of this patent is extended or adjusted under 35 U.S.C. 154(b) by 227 days.

(21) Appl. No.: 14/604,321

(22) Filed: Jan. 23, 2015

(65) Prior Publication Data

US 2016/0049143 A1 Feb. 18, 2016

Related U.S. Application Data (60) Provisional application No. 62/024,833, filed on Jul. 15, 2014, provisional application No. 62/024,843, filed on Jul. 15, 2014, provisional application No. 62/024,823, filed on Jul. 15, 2014.

(51) Int. Cl.
*G10K 11/00* (2006.01)
*G10K 11/34* (2006.01)
*G01S 7/524* (2006.01)
*G01S 7/521* (2006.01)
*G01S 15/06* (2006.01)

(52) U.S. Cl.
CPC ............ *G10K 11/346* (2013.01); *G01S 7/521* (2013.01); *G01S 7/524* (2013.01); *G01S 15/06* (2013.01)

(58) Field of Classification Search
CPC ...... H03M 1/129; G10K 11/346; G01S 15/06; G01S 7/521; G01S 7/524
See application file for complete search history.

(56) References Cited

U.S. PATENT DOCUMENTS

| | | | |
|---|---|---|---|
| 2,861,320 A | 11/1958 | Gravley | 25/25.35 |
| 3,952,387 A | 4/1976 | Itamura | 29/25.25 |
| 4,217,684 A | 8/1980 | Brisken et al. | 29/25.35 |
| 4,370,785 A | 2/1983 | Assenza et al. | 29/25.35 |

(Continued)

FOREIGN PATENT DOCUMENTS

WO WO2009010583 1/2009

OTHER PUBLICATIONS

International Search Report and Written Opinion for corresponding PCT/US2015/030868 dated Jul. 31, 2015.

(Continued)

*Primary Examiner* — Hovhannes Baghdasaryan
(74) *Attorney, Agent, or Firm* — Samuel M. Korte; Maxwell M. Ali (57) ABSTRACT

A marine multibeam sonar device comprises a transmitter, a memory element, and a processing element. The transmitter includes a plurality of transmit channel circuits, each connected to one of a plurality of transmit transducers. Each transmit channel circuit is configured to receive a transmit transducer electronic signal. The transmit transducers are oriented in a linear array that is configured to form a transmit acoustic beam. The processing element is in communication with the transmitter and the memory element and is configured to generate the transmit transducer electronic signals, each including a serial binary bitstream.

16 Claims, 7 Drawing Sheets

(56) References Cited

U.S. PATENT DOCUMENTS

| | | | |
|---|---|---|---|
| 4,385,255 A | 5/1983 | Yamaguchi et al. | 310/335 |
| 4,404,489 A | 9/1983 | Larson, III et al. | 310/334 |
| 4,406,967 A | 9/1983 | Obara et al. | 310/366 |
| 4,411,052 A | 10/1983 | Kampf | 29/25.35 |
| 4,683,396 A | 7/1987 | Takeuchi et al. | 310/358 |
| 4,701,659 A | 10/1987 | Fujii et al. | 310/334 |
| 4,734,963 A | 4/1988 | Ishiyama | 29/25.35 |
| 4,747,192 A | 5/1988 | Rokurota | 29/25.35 |
| 4,773,140 A | 9/1988 | McAusland | 29/25.35 |
| 4,803,392 A | 2/1989 | Kushida et al. | 310/311 |
| 5,051,799 A | 9/1991 | Paul et al. | 375/25 |
| 5,203,335 A * | 4/1993 | Noujaim | G01N 29/0645 600/447 |
| 5,275,167 A | 1/1994 | Killam | 128/662.03 |
| 5,537,380 A | 7/1996 | Sprankle, Jr. et al. | 369/291 |
| 5,655,276 A | 8/1997 | Pattanayak et al. | 29/25.35 |
| 5,730,113 A | 3/1998 | Wildes et al. | 125/13.01 |
| 5,792,058 A | 8/1998 | Lee et al. | 600/459 |
| 5,920,523 A | 7/1999 | Hanafy et al. | 367/140 |
| 5,920,972 A | 7/1999 | Palczewska et al. | 29/25.35 |
| 5,931,684 A | 8/1999 | Obendorf et al. | 439/67 |
| 6,043,590 A | 3/2000 | Gilmore | 310/367 |
| 6,100,626 A | 8/2000 | Frey et al. | 310/334 |
| 6,110,314 A | 8/2000 | Nix et al. | 156/218 |
| 6,198,692 B1 | 3/2001 | Sekine | 367/11 |
| 6,263,551 B1 | 7/2001 | Lorraine et al. | 29/25.35 |
| 6,292,433 B1 * | 9/2001 | Gilbert | G01S 7/52085 367/138 |
| 6,445,646 B1 | 9/2002 | Handa et al. | 367/105 |
| 6,541,896 B1 | 4/2003 | Piel, Jr. et al. | 310/334 |
| 6,775,388 B1 | 8/2004 | Pompei | 381/191 |
| 6,894,425 B1 | 5/2005 | Solomon et al. | 310/334 |
| 7,035,166 B2 | 4/2006 | Zimmerman et al. | 367/88 |
| 7,123,546 B2 | 10/2006 | Zimmerman et al. | 367/103 |
| 7,173,879 B2 | 2/2007 | Zimmerman et al. | 367/103 |
| 7,355,924 B2 | 4/2008 | Zimmerman et al. | 367/88 |
| 7,508,737 B1 | 3/2009 | Alexandru | 367/103 |
| 7,846,101 B2 | 12/2010 | Eberle et al. | 600/459 |
| 8,008,842 B2 | 8/2011 | Jiang et al. | 310/334 |
| 2004/0017224 A1 * | 1/2004 | Turner | H03F 3/087 327/51 |
| 2005/0036404 A1 | 2/2005 | Zhu et al. | 367/88 |
| 2007/0070814 A1 | 3/2007 | Frodyma et al. | 367/134 |
| 2007/0093715 A1 | 4/2007 | Hippe et al. | 600/437 |
| 2008/0192575 A1 | 8/2008 | Coleman | 367/115 |
| 2009/0184853 A1 * | 7/2009 | Udupa | H03M 1/129 341/118 |
| 2009/0299179 A1 * | 12/2009 | Main | A61B 8/065 600/438 |
| 2010/0103775 A1 | 4/2010 | Betts et al. | 345/168 |
| 2011/0202278 A1 | 8/2011 | Caute et al. | 702/14 |
| 2011/0299630 A1 | 12/2011 | Petrovic | 375/340 |
| 2013/0107487 A1 | 5/2013 | Wodnicki et al. | 361/784 |

OTHER PUBLICATIONS

International Search Report and Written Opinion for corresponding PCT/US2015/030871 dated Aug. 27, 2015.
SeaBeam Multibeam Operation, published 2000.
Wassp WMB160F Multi-Beam Fishing System Display Modes (published 2007).
How Wassp Works, published 2012.
Wassp Navigator brochure, published 2012.
Wassp 2013 Brochure, published 2013.
U.S. Appl. No. 14/604,266, filed Jan. 23, 2015.
U.S. Appl. No. 14/604,335, filed Jan. 23, 2015.
U.S. Appl. No. 14/604,242, filed Jan. 23, 2015.
U.S. Appl. No. 14/604,347, filed Jan. 23, 2015.
International Search Report and Written Opinion for corresponding PCT/US2015/030866 dated Jan. 6, 2016.

* cited by examiner

MARINE MULTIBEAM SONAR DEVICE

RELATED APPLICATION

The current non-provisional patent application claims priority benefit, with regard to all common subject matter, of earlier-filed U.S. provisional patent applications entitled "MARINE SONAR DISPLAY DEVICE", Application Ser. No. 62/024,833, filed Jul. 15, 2014; "MARINE MULTIBEAM SONAR DEVICE," Application Ser. No. 62/024,843, filed Jul. 15, 2014; and "A SONAR TRANSDUCER ARRAY ASSEMBLY AND METHODS OF MANUFACTURE THEREOF", Application Ser. No. 62/024,823, filed Jul. 15, 2014. The earlier-filed applications are hereby incorporated by reference into the current application in their entirety.

BACKGROUND

Marine multibeam sound navigation and ranging (sonar) devices typically include one or more transmit devices to generate a sound beam into a body of water and one or more receive devices to detect the reflections of the sound beam. As a result of wave interference and through the use of beamforming techniques, the device may form a sonar beam whose direction in the body of water can be controlled.

SUMMARY

Embodiments of the present technology provide a marine multibeam sonar device comprising a transmitter, a memory element, and a processing element. The transmitter includes a plurality of transmit channel circuits, each connected to one of a plurality of transmit transducers. Each transmit channel circuit is configured to receive a transmit transducer electronic signal. The transmit transducers are oriented in a linear array that is configured to form a transmit acoustic beam. The processing element is in communication with the transmitter and the memory element and is configured to generate the transmit transducer electronic signals, each including a serial binary bitstream.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present technology will be apparent from the following detailed description of the embodiments and the accompanying drawing figures.

BRIEF DESCRIPTION OF THE DRAWING FIGURES

Embodiments of the present technology are described in detail below with reference to the attached drawing figures, wherein.

The drawing figures do not limit the present technology to the specific embodiments disclosed and described herein. The drawings are not necessarily to scale, emphasis instead being placed upon clearly illustrating the principles of the technology.

DETAILED DESCRIPTION

The following detailed description of the technology references the accompanying drawings that illustrate specific embodiments in which the technology can be practiced. The embodiments are intended to describe aspects of the technology in sufficient detail to enable those skilled in the art to practice the technology. Other embodiments can be utilized and changes can be made without departing from the scope of the present technology. The following detailed description is, therefore, not to be taken in a limiting sense. The scope of the present technology is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Embodiments of the present technology relate to a marine multibeam sonar device. The device includes a plurality of transmit channels to transmit sound waves into a body of water and a plurality of receive channels to receive reflections of the sound waves. As a result of wave interference and through the use of beamforming techniques, the device may form a sonar beam whose direction in the body of water can be controlled. Multibeam sonar devices traditionally have not been developed for the consumer market. The devices are often large in size and may require multiple people to install them on a marine vessel. In addition, the performance of traditional multibeam sonar devices may suffer as a result of electrical noise from sources within the marine vessel.

Figure 1:
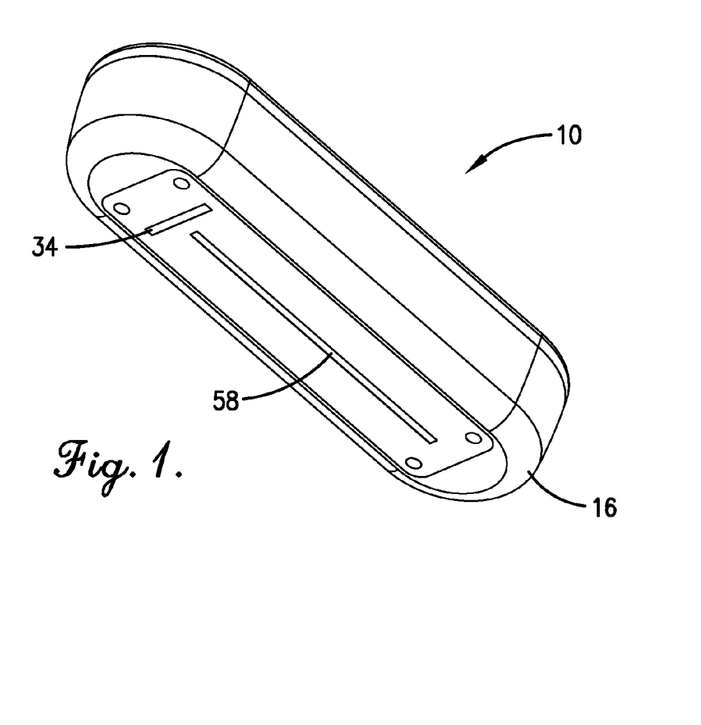
FIG. 1 is a perspective view of a marine multibeam sonar device constructed in accordance with various embodiments of the current technology.
Figure 2:
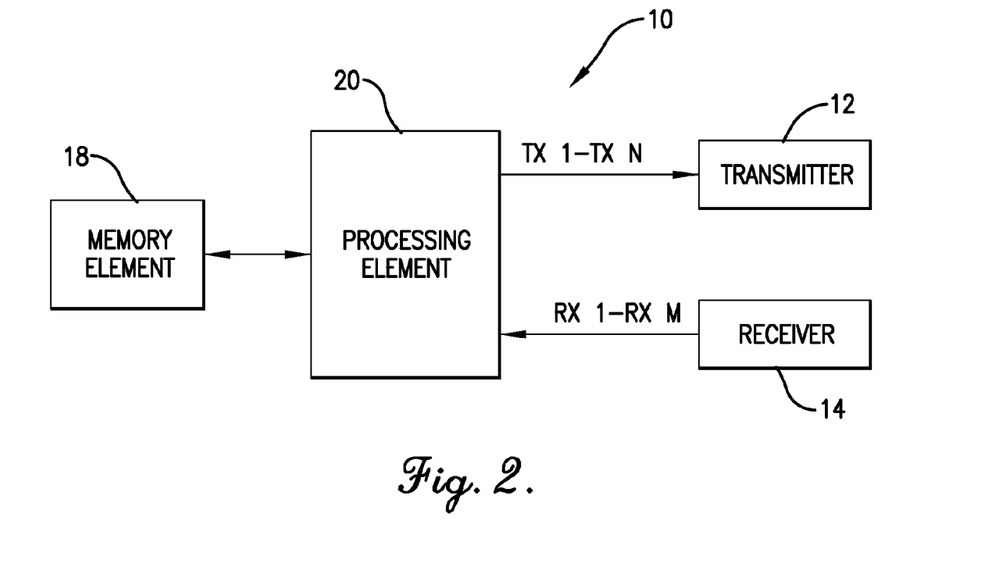
FIG. 2 is block schematic diagram of electronic components of the marine multibeam sonar device.

Embodiments of the technology will now be described in more detail with reference to the drawing figures. Referring initially to FIGS. 1 and 2, a marine multibeam sonar device 10 is illustrated which may utilize beamforming techniques on a plurality of transmit channels and a plurality of receive channels in order to produce a sonar beam whose direction can be controlled. The marine multibeam sonar device 10 may reduce size and cost by multiplexing signals from various channels and may improve performance with noise rejection techniques that involve inverting the polarity of various electronic signals. The marine multibeam sonar device 10 broadly comprises a transmitter 12, a receiver 14, a housing 16, a memory element 18, and a processing element 20.

Figure 3:
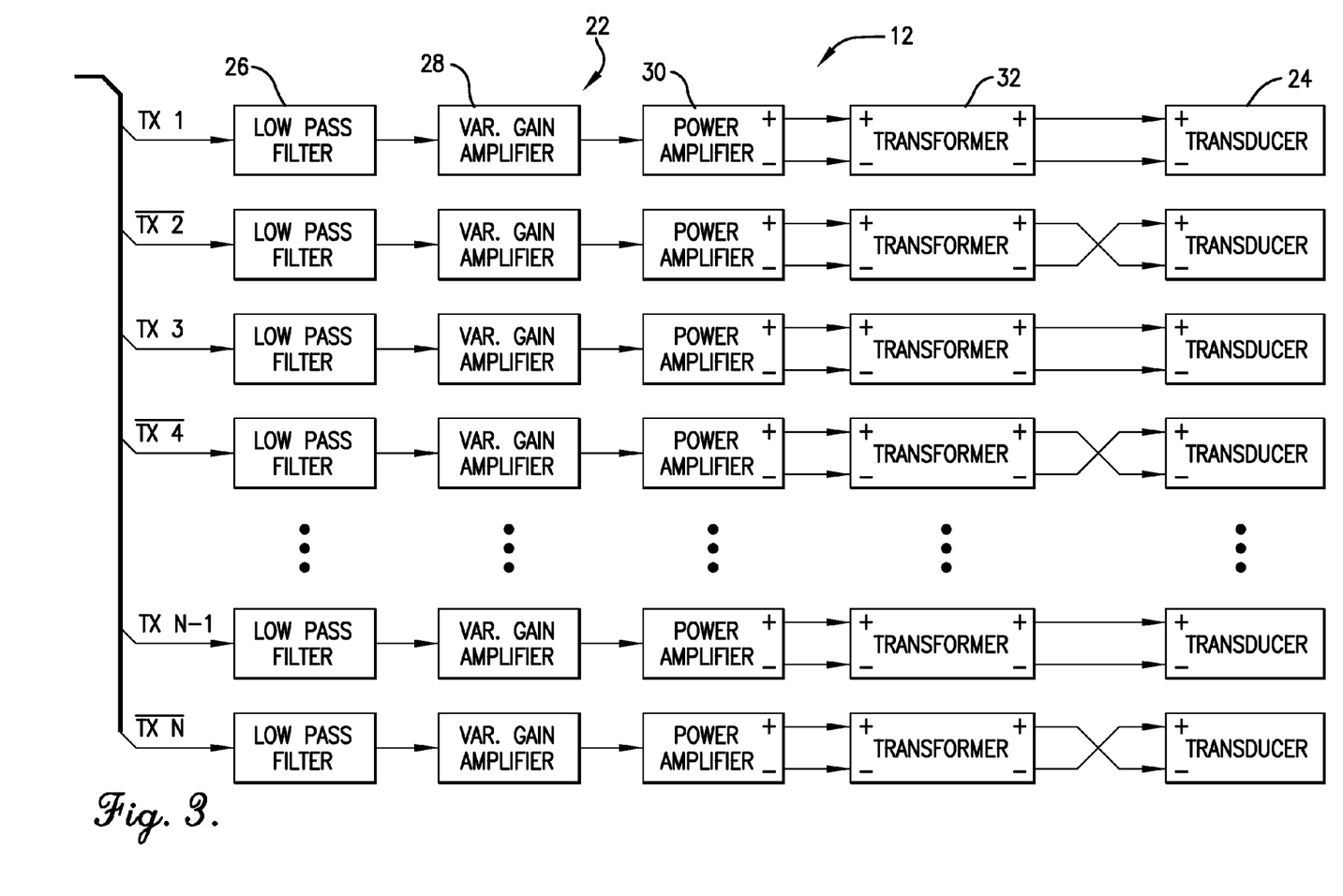
FIG. 3 is block schematic diagram of a plurality of transmit signal processing circuits and a plurality of transmit transducers.

The transmitter 12 may include a plurality of transmit signal processing circuits 22 and a plurality of associated transmit transducers 24. The combination of a transmit signal processing circuit 22 and its associated transmit transducer 24 forms a transmit channel. In an exemplary embodiment, the transmitter 12 may include twenty-four transmit channels. Each transmit signal processing circuit 22, as shown in FIG. 3, may process one of a plurality of transmit transducer electronic signals, indicated as "TX" and "$\overline{\text{TX}}$" in FIG. 3, and may include a low pass filter 26, a variable gain amplifier 28, a power amplifier 30, and a transformer 32.

The low pass filter 26 generally passes frequencies of one transmit transducer electronic signal that are below a cutoff frequency and attenuates frequencies that are greater than the cutoff frequency. The low pass filter 26 may also adjust a shape of the voltage waveform of the transmit transducer electronic signal. The low pass filter 26 may include passive and active electronic components such as resistors, capacitors, operational amplifiers, and the like, to form filtering circuits as are generally known. The cutoff frequency may be chosen to be compatible with sonar operating frequencies.

The variable gain amplifier 28 generally amplifies one transmit transducer electronic signal with a gain that can be varied. The variable gain amplifier 28 may include passive and active electronic components such as potentiometers, resistors, capacitors, operational amplifiers, and the like, to form amplifying circuits as are generally known. The gain may be set by the processing element 20 according to a shading factor, as described in more detail below.

The power amplifier 30 generally amplifies one transmit transducer electronic signal and may include passive and active electronic components such as resistors, capacitors, operational amplifiers, line drivers, and the like, to form amplifying circuits as are generally known. The power amplifier 30 may further convert the single-ended transmit transducer electronic signal to a differential signal.

The transformer 32 generally changes the voltage of one transmit transducer electronic signal and may include a center tap transformer with a primary and a secondary as is generally known. The primary may receive the differential signal from the power amplifier 30. The center tap of the secondary may be connected to ground, while a first terminal of the secondary may present a positive polarity of the transmit transducer electronic signal and a second terminal may present a negative polarity of the transmit transducer electronic signal. In addition, the transformer 32 may be configured as a step-up transformer, wherein the voltages of the secondary are greater than the voltage of the primary.

Each transmit signal processing circuit 22 receives one transmit transducer electronic signal from the processing element 20, filters it, amplifies it, and converts it to a double-ended signal with a positive polarity and a negative polarity with respect to ground. In exemplary embodiments, the device 10 may include twenty-four transmit transducer signals, twenty-four transmit signal processing circuits 22, and twenty-four transmit transducers 24.

Each transmit transducer 24 may include a transducer formed from piezoelectric materials like ceramics such as lead zirconate titanate (PZT) or polymers such as polyvinylidene difluoride (PVDF) that are configured to receive the transmit transducer electronic signal and produce a series of mechanical vibrations or oscillations that generates a corresponding sound beam. The sound beam may be produced with an acoustic polarity that corresponds to an electrical polarity of the transmit transducer electronic signal. For example, a transmit transducer electronic signal with a positive electrical polarity may cause the transmit transducer 24 to generate a sound beam with positive acoustic pressure, while a negative electrical polarity may result in a sound beam with negative acoustic pressure. Thus, the transmit transducer 24 may have a polarity as indicated in FIG. 3.

Figure 4:
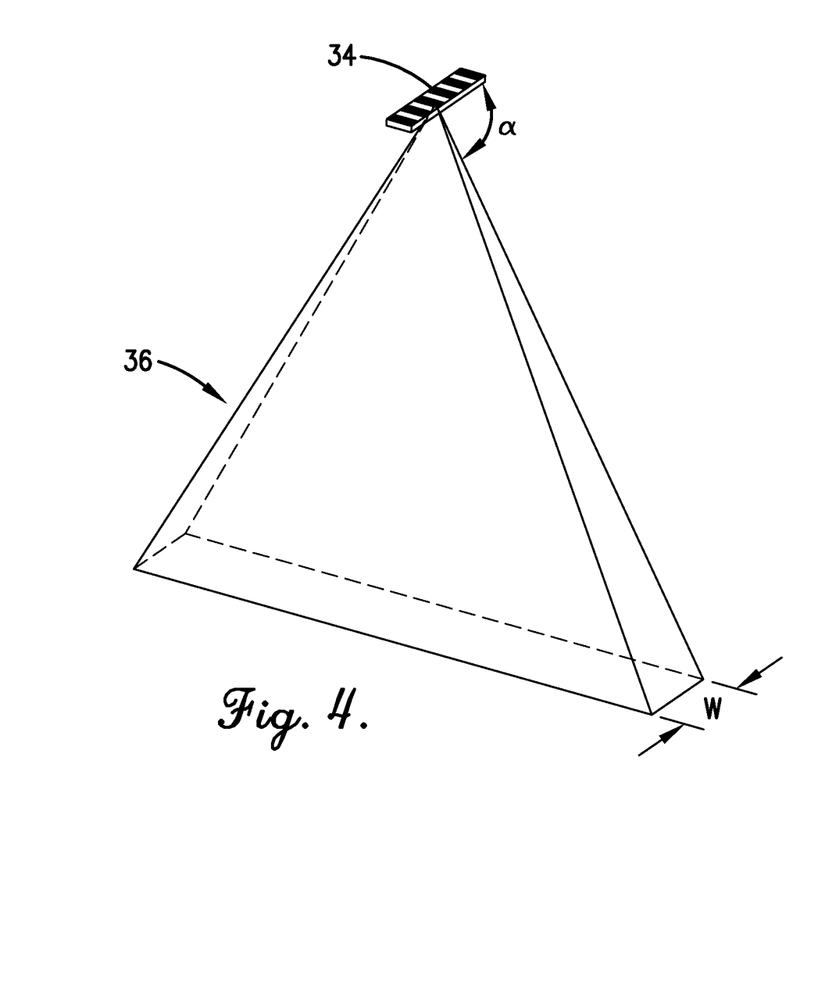
FIG. 4 is a perspective view of a transmit beam generated by a transmit transducer array.
Figure 5:
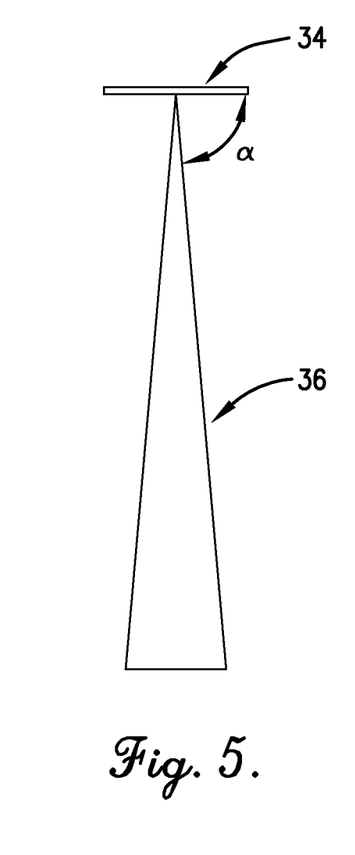
FIG. 5 is a rear view of the transmit beam and the transmit transducer array.

The transmit transducers 24 may be coupled to the transformers 32 such that the transmit transducers 24 of the odd-numbered transmit channels receive the transmit transducer electronic signals with a first polarity while the even-numbered transmit channels receive the transmit transducer electronic signals with a second polarity that is opposite to the first polarity. This coupling scheme may provide noise cancellation as discussed below. The transmit transducers 24 are typically positioned to form a linear array 34, as seen in FIGS. 1, 4, and 5, with spacing between adjacent transducers, wherein the spacing may be related to a wavelength of the sound beam.

The components that form the transmit signal processing circuits 22 and the transmit transducers 24 are typically placed on a printed circuit board (PCB), on a flexible (flex) circuit, or combinations thereof. In an exemplary embodiment, the components of the transmit signal processing circuits 22 are placed on a PCB, while the transmit transducers 24 are placed on a flex circuit.

The transmitter 12 may generate a transmit beam 36 based on the transmit transducer electronic signals, which are received from the processing element 20. Each transmit transducer electronic signal is a series of periodic pulses, such as sine wave pulses or square wave pulses, whose phase can be adjusted. A single series of pulses may be referred to as a "ping". Each transmit transducer 24 produces a sound beam upon receipt of the transmit transducer electronic signal. Given the close proximity of the transmit transducers 24 to one another in the transmit transducer array 34, when each transmit transducer produces a sound beam, constructive and destructive wave interference may occur, creating a pattern of nodes and antinodes that can be shaped to form the transmit beam 36, which functions as a single sound beam.

The transmit beam 36 may include a main lobe and a plurality of side lobes. The main lobe may receive most of the energy and may have a teardrop, or similar, shape that has a base which projects from the transmit transducer array 34. The side lobes receive much less energy and project at angles that place them at the sides of the base of the main lobe. The side lobes may be attenuated by adjusting the gain of the variable gain amplifier 28 of the transmit signal processing circuit 22 connected to the appropriate transmit transducers 24. This gain adjustment may be known as "shading", and the value of the gain may be the shading factor. In some cases the gain for the variable gain amplifier 28 of the transmit signal processing circuit 22 connected to the transmit transducers 24 near the center of the transmit transducer array 34 may be adjusted to be greater than the gain for the transmit transducer 24 near the edges of the transmit transducer array 34.

In operation, the transmit beam 36 may be considered to have a roughly triangular profile with a long, narrow base representing a swath where the beam impacts the water bed. The transmit beam 36 may be oriented such that its longitudinal axis is orthogonal to the axis formed by the transmit transducer array 34. The direction of the transmit beam 36, or its angle α with respect to the array axis as seen in FIGS. 4 and 5, may be controlled or formed by controlling the phase of each sound beam, which in turn may be controlled by the transmit transducer electronic signals. Thus, by properly adjusting the phase of each transmit transducer electronic signal, the direction of the transmit beam 36 may be varied. If the phases are adjusted on successive pings of the transmit transducer electronic signals, then the transmit beam 36 may be swept through a range of angles. When the transmitter 12 is utilized with a marine vessel and the transmit beam 36 is swept, the beam may be swept from front to back of the vessel or from side to side, depending on the orientation of the transmit transducer array 34. In addition, the width of the transmit beam 34, as shown in FIG. 4, may be controlled by adjusting the phase of each transmit transducer electronic signal.

When the marine multibeam sonar device 10 is operating in the marine vessel, electrical noise from sources such as the marine vessel engine, other electronic devices, or the marine multibeam sonar device 10 itself may affect the transmit transducer electronic signals. The noise may be introduced anywhere along the transmit transducer electronic signal path from the low pass filter 26 to the transmit transducer 24. This may result in each transmit transducer electronic signal including a data component, which is supplied by the processing element 20, and a noise component, which comes from the noise sources. One way to reduce the effect that the noise has on the transmit beam 36 is to try to cancel it when forming the transmit beam 36 by taking advantage of destructive wave interference. Both the data component and the noise component have a polarity. Furthermore, both the data component and the noise component are generated in the sound beam that is produced by each transmit transducer 24. If the polarity of the noise component of the sound beam produced by each transmit transducer 24 is inverted as compared with the polarity of the noise component of the sound beams from the two adjacent transmit transducers 24, then the noise components may effectively cancel one another due to destructive wave interference because half the noise components have a positive polarity and the other half of the noise components have a negative polarity. In an exemplary implementation, the noise components from the odd-numbered transmit transducers 24 may have a positive polarity, while the noise components from the even-numbered transmit transducers 24 may have a negative polarity.

The polarity of the noise component of the sound beam from each transmit transducer 24 is determined by the polarity of the noise component of the transmit transducer electronic signal. Thus, inverting the polarity of the sound beam noise component involves inverting the polarity of the electronic signal noise component, which means inverting the polarity of the transmit transducer electronic signal. This is accomplished as shown in FIG. 3 and discussed above wherein the double ended output of the transformer 32 for the even-numbered transmit channels is reversed before it is connected to the transmit transducer 24. Therefore, inverting the polarity of the transmit transducer electronic signal as it goes to the transmit transducer 24 on every other channel may cancel, or at least greatly reduce, the electrical noise. In some configurations, other inversion configurations may be employed. For instance, pairs of channels may be inverted (two non-inverted channels followed by two inverted channels), triplets may be inverted, and the like.

However, inverting the polarity of the transmit transducer electronic signal also inverts the polarity of the data component, which is what gives the transmit beam 36 its proper shape. It would be undesirable to invert the polarity of the data component of the transmit transducer electronic signal for every other transmit channel. In order to avoid this situation, the polarity of the data component of the transmit transducer electronic signal for the even-numbered transmit channels may be generated in an inverted state by the processing element 20 before the transmit transducer electronic signal enters the data path shown in FIG. 3. The inverted polarity signals are indicated in FIG. 3 as "$\overline{TX}$". Thus, when the polarity of the transmit transducer electronic signal for the even-numbered transmit channels is inverted by the transformers 32 before being communicated to the transmit transducers 24, the polarity of the data component for the even-numbered transmit channels is actually re-inverted and restored to its proper state. As a result, the data component of all of the transmit channels has the same polarity when the transmit beam 36 is generated by the transmit transducers 24.

In exemplary embodiments, the polarity of the transmit transducer electronic signals may be inverted on the PCB before the signal is communicated to the transmit transducers 24 on the flex circuit. However, the inversion of the polarity of the transmit transducer electronic signals may be implemented in many other ways.

Figure 6:
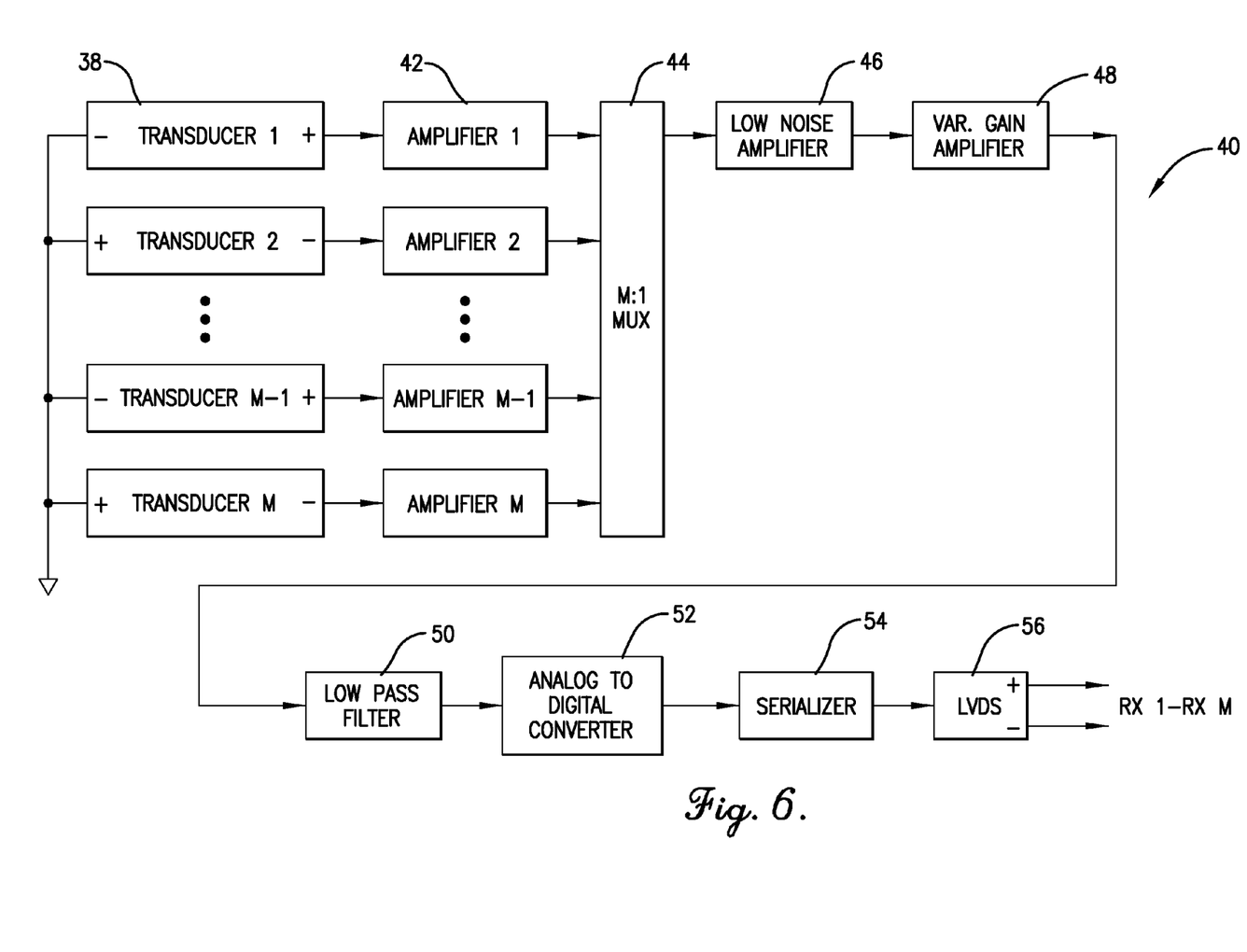
FIG. 6 is block schematic diagram of a plurality of receive transducers and a receive signal processing circuit.

The receiver 14 may include a plurality of receive transducers 38 and a receive signal processing circuit 40, as seen in FIG. 6. Each receive transducer 38 may also be considered as providing a receive channel. In exemplary embodiments, the receiver 14 may include sixty receive transducers 38 or sixty receive channels. The receive transducers 38 may each include a transducer formed from piezoelectric materials like ceramics such as lead zirconate titanate (PZT) or polymers such as polyvinylidene difluoride (PVDF) that are configured to receive a mechanical force or pressure. Each receive transducer 38 may generate a receive transducer electronic signal, which includes a variable voltage corresponding to the mechanical force. As with the transmit transducer 24, the receive transducer 38 may have a polarity, such as a positive surface or terminal and a negative surface or terminal, wherein the polarity of the voltage generated, and in turn, the receive transducer electronic signal, may correspond to the polarity of the acoustic pressure applied to the receive transducer 38. Typically, the receive transducer electronic signal is a series of periodic pulses, such as sine wave pulses. In some embodiments, the receive transducers 38 may be formed from the same material as the transmit transducers 24. In various embodiments, the receive transducers 38 may be implemented such that the polarity of the even-numbered receive transducer electronic signals is inverted compared with the polarity of the odd-numbered receive transducer electronic signals. One way to invert the polarity of the even-numbered receive transducer signals is to connect the positive terminal of the even-numbered receive transducers 38 to ground and the negative terminal to the receive signal processing circuit 40, while the odd-numbered receive transducers 38 have their negative terminal connected to ground and their positive terminal connected to the receive signal processing circuit 40.

The receive signal processing circuit 40 may include a plurality of amplifiers 42, a multiplexer 44, a low noise amplifier 46, a variable gain amplifier 48, a low pass filter 50, an analog to digital converter (ADC) 52, a serializer 54, and a low voltage differential signal (LVDS) driver 56.

Each amplifier 42 generally receives one receive transducer electronic signal from one receive transducer 38 and amplifies the signal. Each amplifier 42 may include passive and active electronic components such as resistors, capacitors, operational amplifiers, and the like, to form amplifying circuits as are generally known.

The multiplexer 44 generally performs a time division multiplexing of the receive transducer electronic signals from the amplifiers 42. The multiplexer 44 may include a plurality of analog switches that receive a plurality of analog signals and selectively pass one of the signals. The multiplexer 44 may include successive stages of analog switches. The multiplexer 44 may further include a plurality of control signals that select the receive transducer electronic signal to pass to its output. The processing element 20 may control the level of the control signals. Typically, the control signals are set such that each receive transducer electronic signal is passed to the output of the multiplexer 44 in successive order for consecutive time slots, each time slot lasting for a first period of time. Thus, the output of the multiplexer 44 may be a receive electronic signal which includes a stream of the receive transducer electronic signals, each signal per time slot.

The low noise amplifier 46 generally amplifies the receive electronic signal and may include passive and active electronic components such as resistors, capacitors, operational amplifiers, and the like, to form amplifying circuits as are generally known.

The variable gain amplifier 48 generally amplifies the receive electronic signal with a gain that can be varied. The variable gain amplifier 48 may include passive and active electronic components such as potentiometers, resistors, capacitors, operational amplifiers, and the like, to form amplifying circuits as are generally known.

The low pass filter 50 generally passes frequencies of the receive electronic signal that are below a cutoff frequency and attenuates frequencies that are greater than the cutoff frequency. The low pass filter 50 may include passive and active electronic components such as resistors, capacitors, operational amplifiers, and the like, to form filtering circuits as are generally known. The low pass filter 50 may also perform an antialiasing function and thus, the cutoff frequency may be related or proportional to the rate at which the ADC 52 samples the receive electronic signal.

The ADC 52 generally samples the receive electronic signal and generates a corresponding digital value. The analog to digital converter may include comparators, encoders, and other passive and active components as are generally known. The ADC 52 may output a multibit, parallel digital value corresponding to the voltage level of the receive electronic signal.

The serializer 54 generally receives the multibit, parallel digital value of the receive electronic signal from the ADC 52 and converts it to a serial stream of bits. The serializer 54 may include shift registers or similar components that convert parallel data into serial data.

The LVDS driver 56 generally converts the single ended serial bitstream from the serializer 54 to a low voltage differential signal. The LVDS driver 56 may include passive and active electronic components such as resistors, capacitors, operational amplifiers, and the like, to create differential signals. Furthermore, the LVDS driver 56 may output a differential signal that conforms to the LVDS standard.

The receive signal processing circuit 40 may receive the receive transducer electronic signals from the receive transducers 38 and may generate the receive electronic signal, which includes digital samples of the receive transducer electronic signals in a differential voltage bitstream, indicated as RX 1-RX M in FIG. 6. The bitstream of digital samples forms a stream of packets, one packet for each receive channel in successive order, wherein the packet includes data from a time sliced portion of the associated receive transducer electronic signal. The receive signal processing circuit 40 may communicate the receive signal to the processing element 20.

In various embodiments, the low noise amplifier 46, the variable gain amplifier 48, the low pass filter 50, the ADC 52, the serializer 54, and the LVDS driver 56 may implemented as one or more channels of an analog front end circuit. Furthermore, the device 10 may include a plurality of multiplexers 44, wherein each multiplexer 44 multiplexes only a portion of the receive transducer electronic signals and communicates its output to one of the channels of the analog front end circuit. In addition, the analog front end circuit may generate a plurality of receive electronic signals, each one including a bitstream of only a portion of the receive transducer electronic signals.

The components that form the receive transducers 38 and the receive signal processing circuits 40 are typically placed on a PCB, on a flex circuit, or combinations thereof. In an exemplary embodiment, the receive transducers 38 and the amplifiers 42 are placed on a flex circuit, while the other components of the receive signal processing circuit 40 are placed on a PCB. In various embodiments, the other components of the receive signal processing circuit 40 are placed on the same PCB as the transmit signal processing circuits 22.

Figure 7:
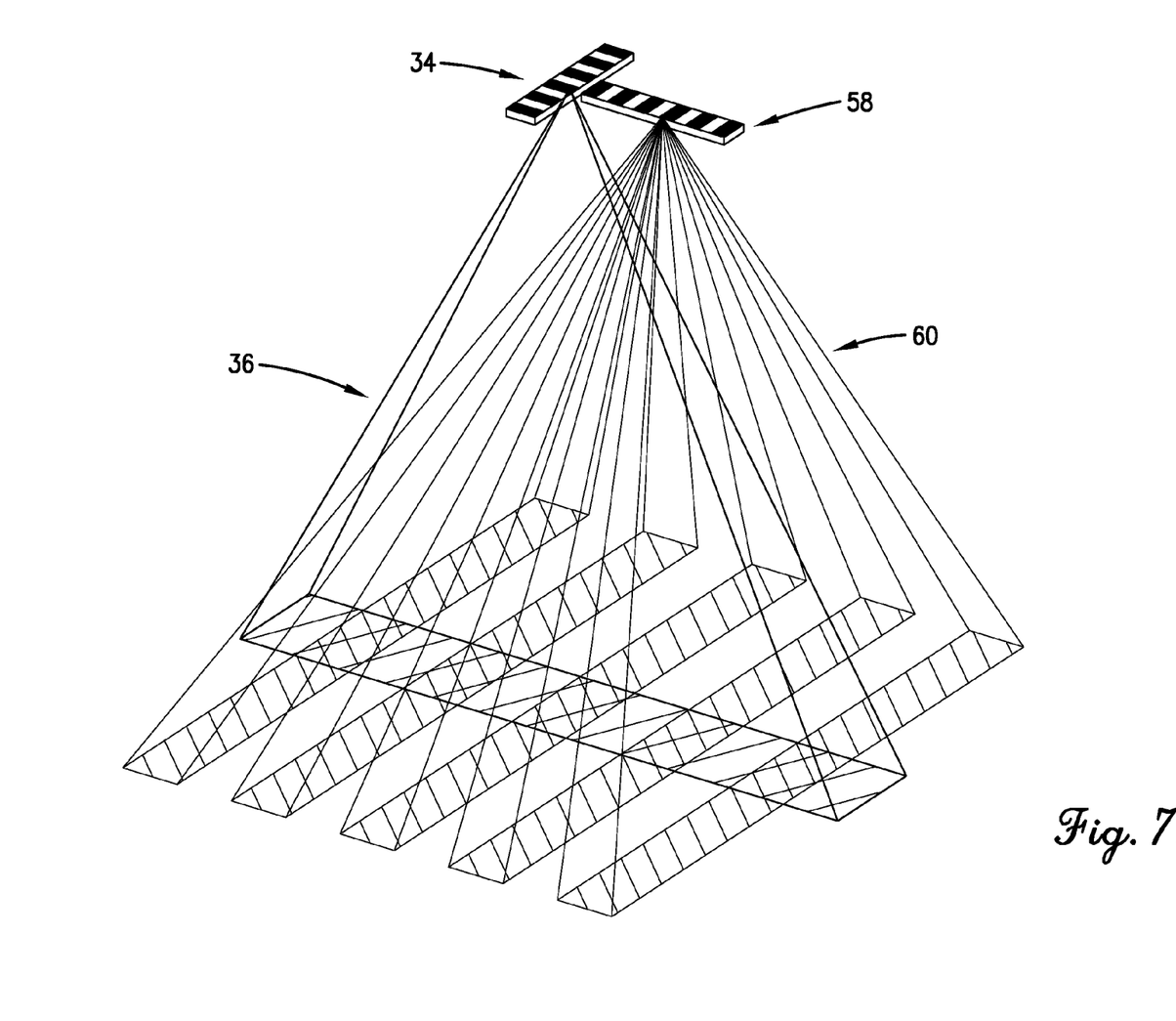
FIG. 7 is a perspective view of just the transmit transducer array and a receive transducer array, further illustrating the transmit beam and a plurality of receive beams.

The receive transducers 38 are typically positioned to form a linear array 58, similar to the transmit transducer array 34 and seen in FIGS. 1 and 7, with spacing between adjacent transducers, wherein the spacing may be related to the wavelength of the transmit beam 36. Given the close proximity of the receive transducers 38 to one another, the reflections of the transmit beam 36 received by the receive transducers 38 may be subject to wave interference properties. In addition, the data of each receive channel is associated with, or includes, a phase or time delay which may be adjusted. "Phase," as utilized herein, refers to a phase shift of a signal or equivalently a time delay of whole cycles which includes a partial cycle phase shift. These phase values may be utilized by the processing element 20 when sonar data is calculated, as described in more detail below. A particular set of phase values may determine the reflections that are received at a particular angle with respect to the receive transducer array 58. The combination of the particular phase values and receive channel data may be considered a receive beam 60, as seen in FIG. 7. Varying the phase values also varies the angle of the receive beam 60, with one set of phase values for each angle desired. The receive beam 60 may have a roughly triangular profile with a long, narrow base representing a swath where the beam reflects from the water bed. Furthermore, the receive beam 60 may be oriented such that its longitudinal axis is orthogonal to the axis formed by the receive transducer array 58.

The receive transducer array 58 may be oriented with its linear axis orthogonal to the linear axis of the transmit transducer array 34. In various embodiments, the receive transducer array 58 may be positioned such that one end of the receive transducer array 58 is adjacent to the center of the transmit transducer array 34, as seen in FIGS. 1 and 7. This orientation allows the receive beam 60 to be swept across the path of the transmit beam 36 in order to determine the angular direction of the water bed features or other objects that reflect the transmit beam 36.

Figure 8:
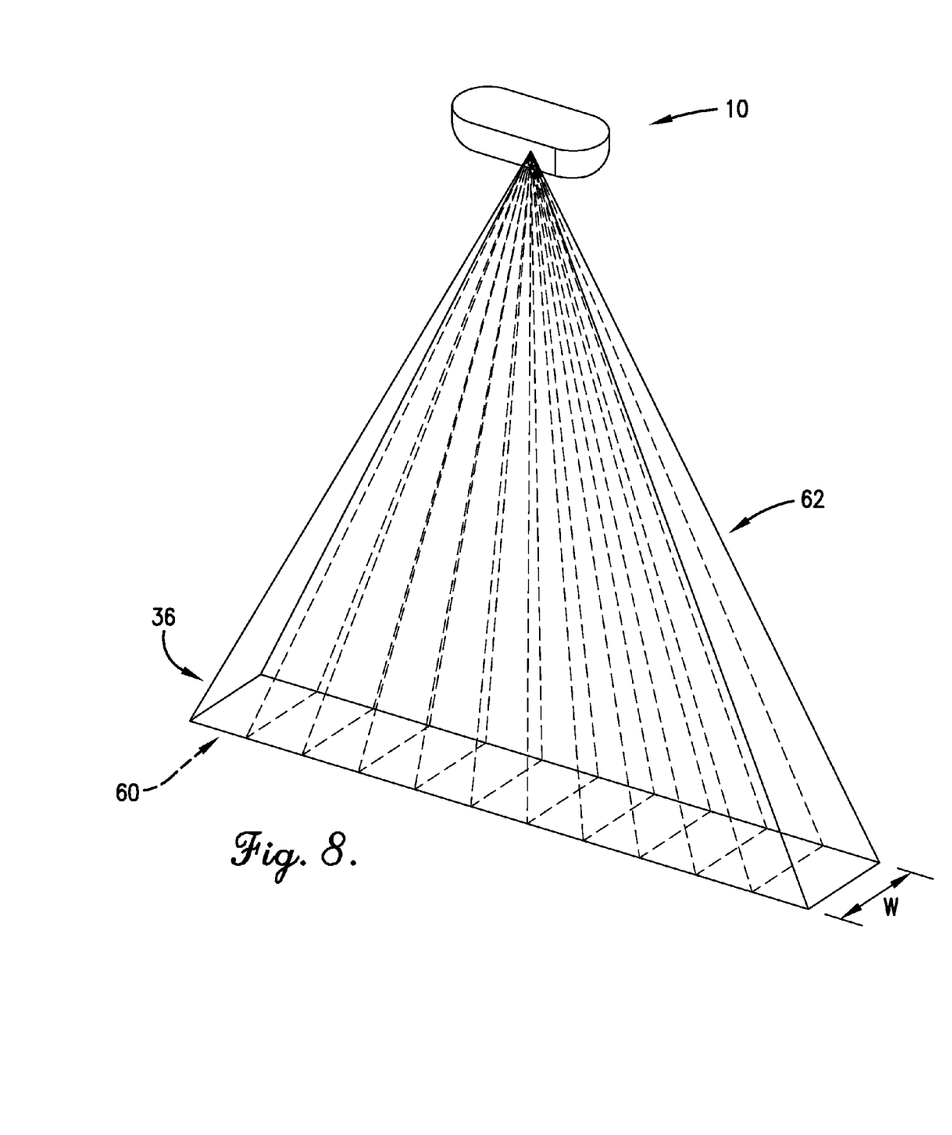
FIG. 8 is a perspective view of the marine multibeam sonar device a sonar beam.
Figure 9:
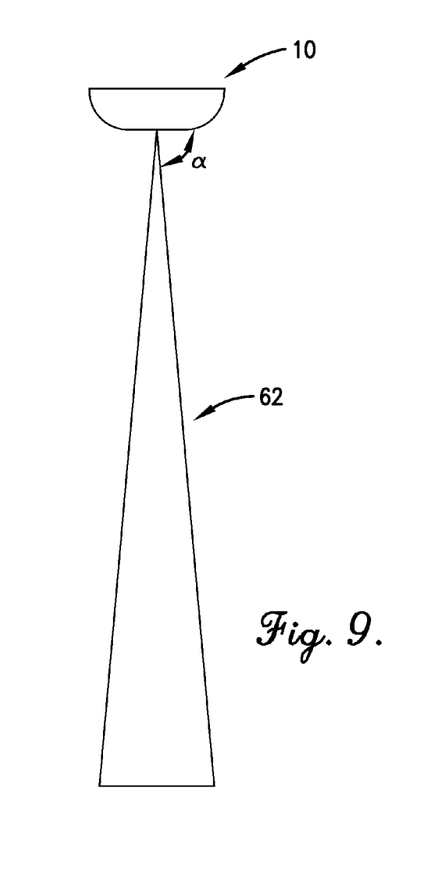
FIG. 9 is a rear view of the marine multibeam sonar device and the sonar beam.

The housing 16, as seen in FIGS. 1, 8, and 9, generally encloses the other components of the marine multibeam sonar device 10. The housing 16 may include a top wall, a bottom wall, and four sidewalls. In some embodiments, the sidewalls may be rounded or may have a curvature. The transmit transducer array 34 and the receive transducer array 58 may be positioned in an opening on the bottom wall, as seen in FIG. 1, so that they may be encapsulated and/or potted therein. In one configuration, the housing 16 is formed of molded plastic although other suitable materials may be employed.

The housing 16 is typically mounted to a hull of the marine vessel, but may be mounted anywhere which provides access to a body of water. The specific position and orientation of the housing 16 may depend on the type of scanning for which the marine multibeam sonar device 10 is utilized. With down and side scanning, the housing 16 may be mounted to the hull of the marine vessel such that the transmit transducer array 34 and the receive transducer array 58 lie in a horizontal plane with the transmit transducer array 34 extending between the forward and rear ends of the marine vessel and the receive transducer array 58 extending between the port and starboard sides of the marine vessel. With forward scanning, the housing 16 may be mounted to the hull of the marine vessel such that the transmit transducer array 34 and the receive transducer array 58 lie in a plane that is tilted approximately 45 degrees with respect to the horizontal. In addition, the transmit transducer array 34 may extend between the port and starboard sides of the marine vessel and the receive transducer array 58 may extend between the forward and rear ends of the marine vessel. In some embodiments, the housing 16 may include one or more mechanisms, such as servo motors, that will tilt and rotate the transmit transducer array 34 and the receive transducer array 58 in order to switch between modes of scanning.

The memory element 18 may include data storage components such as read-only memory (ROM), programmable ROM, erasable programmable ROM, random-access memory (RAM) such as static RAM (SRAM) or dynamic RAM (DRAM), hard disks, floppy disks, optical disks, flash memory, thumb drives, universal serial bus (USB) drives, or the like, or combinations thereof. The memory element 18 may include, or may constitute, a "computer-readable medium". The memory element 18 may store the instructions, code, code segments, software, firmware, programs, applications, apps, services, daemons, or the like that are executed by the processing element 20. The memory element 18 may also store settings, data, documents, sound files, photographs, movies, images, databases, and the like.

The processing element 20 may include processors, microprocessors, microcontrollers, digital signal processors (DSPs), field-programmable gate arrays (FPGAs), analog and/or digital application-specific integrated circuits (ASICs), or the like, or combinations thereof. The processing element 20 may generally execute, process, or run instructions, code, code segments, software, firmware, programs, applications, apps, processes, services, daemons, or the like, or may step through states of a finite-state machine, or combinations of these actions. The processing element 20 may be in communication with the other electronic components through serial or parallel links that include address busses, data busses, control lines, and the like.

The processing element 20 may be configured to control the operation of the transmitter 12. The processing element 20 may generate the transmit transducer signal for each transmit transducer 24. Each transmit transducer signal may include a digital bitstream of ones and zeroes that create a periodic waveform. The processing element 20 may generate each transmit transducer signal so that it includes a bitstream with the proper phase adjustment of each transmit transducer 24 for the transmitter 12 to project the transmit beam 36 at the desired angle $\alpha$, as shown in FIGS. 4 and 5, and width, as shown in FIG. 4. In general, the processing element 20 may include pattern generating hardware or software algorithms that can generate the bitstream. In addition, the processing element 20 may invert the polarity of the bitstream for every other transmit channel. In exemplary embodiments, the processing element 20 may invert the polarity of the bitstream for the even-numbered transmit channels. In some configurations, the processing element 20 may employ other inversion schemes, such as inverting pairs of transmit channels, inverting triplets of transmit channels, and the like.

In exemplary embodiments, a bitstream waveform pattern may be created and stored in the memory element 18. The pattern may form a periodic wave, such as a sine wave, a triangle wave, a square wave, and the like. The pattern may be used to create a ping or a series of pings. In certain embodiments, a plurality of bitstream waveform patterns may be created and stored in the memory element 18, wherein each pattern may form a different wave shape or have another unique characteristic.

When the transmit transducer array 34 is generating the transmit beam 36, each transmit transducer 24 generates the same periodic acoustic waveform with the phase of the waveform appropriately adjusted to form the transmit beam 36 and to steer it. Since the bitstream pattern of each transmit transducer electronic signal is used to create the acoustic waveform, the phase of each bitstream pattern is adjusted in order to adjust the phase of the acoustic waveform emanating from the transmit transducer 24. The processing element 20 communicates the same bitstream pattern to each transmit channel, but appropriately adjusts the phase of the pattern for each channel. The processing element 20 adjusts the phase of the bitstream pattern by selecting the appropriate bit within the pattern to start generating the bitstream. For example, if the bitstream pattern is 100 bits long, then the processing element 20 may start generating the bitstream for a first transmit channel at bit 1 of the pattern, a second transmit channel at bit 20, a third transmit channel at bit 30, and so forth, with all of the bitstreams being generated and communicated to the transmitter 12 at roughly the same time. Thus, the processing element 20 may generate the bitstream pattern for each transmit channel with an offset within the pattern.

Generally, the offset of the bitstream pattern for each transmit channel is determined by the position of the associated transmit transducer 24 in the transmit transducer array 34. Some transmit channels may have the same offset, while others may have a different offset. By offsetting the bitstream pattern for at least a portion of the transmit channels, the processing element 20 effectively sets the relative phase of each transmit transducer electronic signal and, in turn, the phase of the acoustic waveform generated by each transmit transducer 24. In this fashion, the transmit beam 36 is properly formed. Furthermore, by adjusting the offset in the bitstream pattern for each transmit channel, the transmit beam 36 may be steered to the desired angle $\alpha$. In addition, the processing element 20 may send a value to the variable gain amplifier 28 of each transmit signal processing circuit 22 to adjust its gain in order to properly shade the side lobes of the transmit beam 36 and/or adjust the width of the beam 36. The processing element 20 may perform the above-described actions for each ping of the transmit beam 36.

The processing element 20 may be configured to calculate sonar data based on the reception of the reflections of the transmit beam 36. The processing element 20 may receive the receive transducer electronic signals as a bitstream from the receive signal processing circuit 40. The bitstream may include a packet of data for the first receive channel followed by a packet of data for the second receive channel and so forth for all of the receive channels.

As mentioned above for the transmit transducer electronic signals, electrical noise from a variety of sources may affect the receive transducer electronic signals as well. Likewise, the receive transducer electronic signals may each include a data component, supplied by the receive transducer 38, and a noise component from the noise sources. Furthermore, the noise may be canceled, or at least greatly reduced, by taking advantage of similar properties that the receive channels have with the transmit channels. The noise components may be canceled by inverting their polarities on every other receive channel. The polarity of the noise component of the appropriate receive channels may be inverted by inverting the polarity of the appropriate receive transducer electronic signals. Since the receive transducer electronic signals are received by the processing element 20 as a packet of data for each receive channel, the processing element 20 may invert the data included in every other packet—thereby inverting the polarity of the noise component for every other receive channel. In exemplary embodiments, the processing element 20 may invert the data from all of the even-numbered receive channels. When the processing element 20 is calculating the sonar data as discussed in more detail below, the noise components may cancel each other out.

However, as with the transmit transducer electronic signals, inverting the polarity of the receive transducer electronic signals also inverts the polarity of the data component of those receive channels, which would cause a misinterpretation of the data from those channels. In order to avoid this problem, the polarity of the even-numbered receive transducer electronic signals is inverted from the receive transducer 38, as shown in FIG. 6 and discussed above. Thus, when the processing element 20 inverts the data in the packets from the even-numbered receive channels, the processing element 20 is actually re-inverting the data so that the polarity of the receive transducer electronic signal is restored to its proper state, thereby allowing the calculations of the sonar data to be performed correctly.

The processing element 20 may perform a series of calculations on the receive channel data to determine the features of the water bed or underwater objects in the path of the transmit beam 36. The processing element 20 may set the phase value for each receive transducer electronic signal to calculate sonar data for the receive beam 60 being positioned at a first angle. Typically, the first angle is set for the receive beam 60 to point at one edge of the transmit beam 36 swath. The processing element 20 may also adjust the phase value for each receive transducer electronic signal to calculate sonar data for the receive beam 60 being positioned at a plurality of incrementally increasing angles, wherein the last angle corresponds to the opposite edge of the transmit beam 36 swath.

In some embodiments, the calculations of the sonar data may be performed as a set of simultaneous equations or a matrix equation. Furthermore, calculations such as a fast Fourier transform (FFT) may be performed to compute the sonar data. The time delay from when the ping was generated until the reflections were received may determine the depth of objects in the transmit beam 36 path or the water bed. The amplitude, intensity, or other characteristics of the sonar data may determine the density of the objects in the transmit beam 36 path or the water bed.

Referring to FIG. 7, the marine multibeam sonar device 10 may function as follows. The transmitter 12 may receive the transmit transducer electronic signals from the processing element 20 and, in turn, may generate a ping or a short burst of pings along the transmit beam 36 path (whose angle is determined by controlling the phase of the transmit transducer electronic signal to each transmit transducer 24). The receive transducer array 58 may receive the reflections of the transmit beam 36 and each receive transducer 38 may generate a receive transducer electronic signal. The receive transducer electronic signals may be communicated to the processing element 20, which performs a series of calculations on the data from each receive channel. The calculations may determine how the receive beams 60 are formed to receive the transmit beam 36 reflections at successive angles. The combination of the single transmit beam 36 and the multiple receive beams 60 may form a sonar beam 62 where the transmit beam 36 and the receive beams 60 overlap. Thus, each sonar beam 62 may be thought of as emanating from a single point and formed from a single transmit beam 36 and a plurality of receive beams 60, as seen in FIG. 7, wherein the number of receive beams 60 may depend on the resolution of the sonar beam 62 that is desired. Generally, the higher the number of receive beams 60, the greater the resolution. Furthermore, the sonar beam 62 may be projected at the same angle α, as seen in FIGS. 8 and 9, with respect to the plane of the transmit transducer array 34 and the receive transducer array 58 as the transmit beam 36. In addition, since the sonar beam 62 is formed from the transmit beam 36, the width of the sonar beam 62, as shown in FIG. 8, may be controlled by adjusting the phase of each transmit transducer electronic signal.

The marine multibeam sonar device 10 may have one or more modes of operation. In a first mode, the marine multibeam sonar device 10 may generate the sonar beam 62 at a fixed angle α for repeated pings. Typically, the angle α is set for approximately 90 degrees, such that the sonar beam 62 points roughly straight down beneath the marine vessel for down and side scanning or roughly straight forward for forward scanning. This mode may be useful for surveying or mapping the water bed. In addition, the sonar beam 62 may be set and held at angles α other than 90 degrees, depending on the application of the marine multibeam sonar device 10. Furthermore, the width of the sonar beam 62 may be adjusted so that more area of the water bed is covered when "live" sonar images are being viewed.

In a second mode, the sonar beam 62 may be swept across a range of angles, wherein the sonar beam 62 is projected on a first ping at the minimum angle α. On successive pings, the sonar beam 62 may be projected at incrementally increasing angles α until the maximum angle α is reached. When used for down and side scanning, the sonar beam 62 may be swept from forward to rear, or vice versa. When used for forward scanning, the sonar beam 62 may be swept from starboard to port, or vice versa. This mode may be useful when the marine vessel is still or is moving slowly, or when trying to locate underwater objects, such as schools of fish.

The marine multibeam sonar device 10 may be in communication with external equipment, devices, and systems that can display sonar imagery based on the sonar data. Thus, the marine multibeam sonar device 10 may communicate the sonar data to the external equipment. Furthermore, the external equipment might direct the marine multibeam sonar device 10 as to the mode in which to operate. For example, depending on user preferences, the external equipment might direct the marine multibeam sonar device 10 to hold the sonar beam 62 at a fixed angle or to sweep the sonar beam 62.

Figure 10:
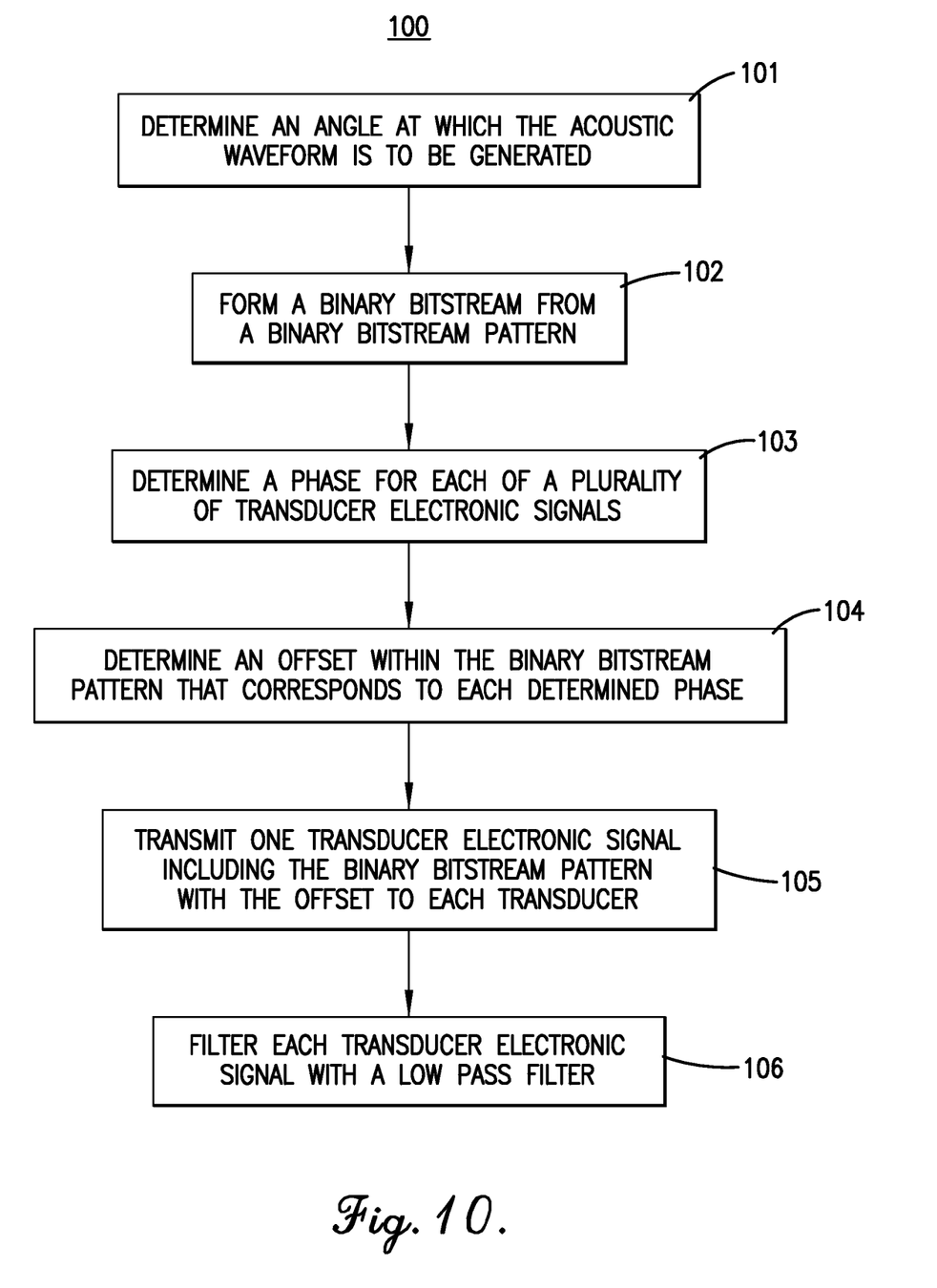
FIG. 10 is a flow diagram of at least a portion of the steps of a method of generating an acoustic waveform with a transducer array including a plurality of transducers.

At least a portion of the steps of a method 100, in accordance with various aspects of the current technology, of generating an acoustic waveform with a transducer array 34 including a plurality of transducers 24 is listed in FIG. 10. The steps of the method 100 may be performed in the order as shown in FIG. 10, or they may be performed in a different order. Furthermore, some steps may be performed concurrently as opposed to sequentially. In addition, some steps may not be performed.

Referring to step 101, an angle is determined at which the acoustic waveform is to be generated. The acoustic waveform may be a sonar beam 62, or a portion thereof, generated by the transmit transducer array 34, which is implemented in a system or device for displaying sonar images, wherein each sonar image is derived from one or more pings of the sonar beam 62. The angle of the sonar beam 62 may be determined by input from the user regarding viewing modes of the sonar images. For example, the user may choose a viewing mode in which the sonar beam is generated at a constant angle for repeated pings. Alternatively, the user may choose a viewing mode in which the sonar beam is swept across a range of angles during a series of pings.

Referring to step 102, a binary bitstream is formed from a binary bitstream pattern. The binary bitstream may be an arbitrary sequence of ones and zeros. The binary bitstream pattern may be a series of ones and zeros that corresponds to a shape of the acoustic waveform. The binary bitstream pattern may be periodic. When the binary bitstream is transmitted, as discussed below, exemplary embodiments of the binary bitstream include the specific binary bitstream pattern. The binary bitstream pattern may be stored in a memory element 18.

Referring to step 103, a phase may be determined for each of a plurality of transmit transducer electronic signals. The transmit transducer electronic signals are to be communicated to the transmit transducer array 34, one signal to each transmit transducer 24. Each transmit transducer electronic signal is a periodic signal which includes the binary bitstream and each signal has its own value of the phase. The value may vary according to the angle at which the acoustic waveform is to be generated. The value may also vary according to the position within the transmit transducer array 34 of the associated transducer 24.

Referring to step 104, an offset is determined within the binary bitstream pattern that corresponds to each determined phase. Since the binary bitstream pattern is periodic, a phase of the pattern can be determined as well. The phase of the binary bitstream pattern may also be considered an offset, such as a bit position, within the bit pattern. Thus, the offset within the binary bitstream pattern corresponds to the phase of the transmit transducer electronic signal.

Referring to step 105, one transmit transducer electronic signal is transmitted to each of the transmit transducers 24. A processing element 20 may transmit the transmit transducer electronic signals to the transmit transducers 24. The transmit transducer electronic signals each include a binary bitstream, and some embodiments of the processing element 20 may include hardware and/or software to generate the binary bitstreams. However, exemplary embodiments of the processing element 20 may retrieve the binary bitstream pattern from the memory element 18 and may start generating the pattern at the offset point that corresponds to the determined phase of the transmit transducer electronic signal for each transducer 24.

Referring to step 106, each transmit transducer electronic signal is filtered. The marine multibeam sonar device 10 may include transmit signal processing circuits 22 that each include a low pass filter 26 which may shape the waveform of the transmit transducer electronic signal. The processing element 20 may transmit the transmit transducer electronic signals to the transmit signal processing circuits 22 which process the signals and then communicate them to the transmit transducers 24.

Although the technology has been described with reference to the embodiments illustrated in the attached drawing figures, it is noted that equivalents may be employed and substitutions made herein without departing from the scope of the technology.

What is claimed is:

1. A marine multibeam sonar device comprising:
   a transmitter including a plurality of transmit channel circuits, each transmit channel circuit configured to receive a transmit transducer electronic signal and including a low pass filter;
   a plurality of transmit transducers, each transmit transducer connected to one of the plurality of transmit channel circuits, oriented in a linear array that is configured to form a transmit acoustic beam based on shaped transmit transducer electronic signals;
   a memory element; and
   a processing element in communication with the transmitter and the memory element, the processing element being configured to—
      generate the transmit transducer electronic signals, each including a serial binary bitstream formed from a single bitstream pattern of a series of ones and zeros corresponding to a sine wave shape;
   wherein the low pass filter is configured to shape the transmit transducer electronic signal as a sine wave.

2. The marine multibeam sonar device of claim 1, wherein the single bitstream pattern is stored in the memory element.

3. The marine multibeam sonar device of claim 2, wherein the processing element communicates the bitstream pattern to each transmit channel circuit with an offset determined by a position of the associated transmit transducer in the array, the offset being a point in the pattern at which the bitstream is started.

4. The marine multibeam sonar device of claim 3, wherein each bitstream pattern forms a periodic signal with a phase that is adjusted to control an angle at which the transmit beam is generated and the processing element is further configured to adjust the phase by adjusting the offset for each transmit channel circuit.

5. The marine multibeam sonar device of claim 1, wherein each transmit channel circuit includes a low pass filter configured to adjust a shape of a voltage waveform of one of the transmit transducer electronic signals.

6. The marine multibeam sonar device of claim 1, further comprising:
   a receiver configured to receive reflections of the transmit acoustic beam, the receiver including—
      a plurality of receive channels, each receive channel including a receive transducer configured to generate a receive transducer electronic signal, and
      electronic circuitry configured to receive the receive transducer electronic signals and generate a receive signal including a stream of binary data packets each packet including data from a time sliced portion of one of the receive transducer electronic signals, and the processing element is further configured to—
retrieve the binary data packet for each receive channel contained in the receive signal, and
generate sonar data from the binary data packets.

7. The marine multibeam sonar device of claim 5, wherein the electronic circuitry of the receiver further comprises—
a multiplexer configured to receive the receive transducer electronic signal from each receive transducer and generate a multiplexer signal that includes a time sliced portion of each of the receive transducer electronic signals in successive order,
an analog to digital converter configured to receive the multiplexer signal and generate a parallel multibit binary output that is a digital value corresponding to an analog voltage of the multiplexer signal, and
a serializer configured to receive the analog to digital converter output and generate a serializer signal that is a conversion of the parallel output of the analog to digital converter to a serial bitstream.

8. The marine multibeam sonar device of claim 7, wherein the electronic circuitry of the receiver further comprises a low voltage differential swing circuit configured to receive the serializer signal and generate the receive signal that is a differential voltage form of the serializer signal.

9. A marine multibeam sonar device comprising:
a receiver configured to receive reflections of a transmit acoustic beam, the receiver including—
a plurality of receive channels, each receive channel coupled to a receive transducer configured to generate a receive transducer electronic signal, and
electronic circuitry configured to receive the receive transducer electronic signals from each receive transducer and generate a receive signal including a serial bitstream of binary data packets, the electronic circuitry including:
a multiplexer configured to selectively output one of the receive transducer electronic signals at a time by generating a multiplexer signal that includes a time sliced portion of each of the receive transducer electronic signals in successive order for consecutive time slots,
a low pass filter having a cutoff frequency, and
an analog to digital converter configured to receive the multiplexer signal and generate a parallel multibit binary output that is a digital value corresponding to an analog voltage of the multiplexer signal;
a memory element; and
a processing element in communication with the receiver and the memory element, the processing element being configured to—
receive and deserialize the receive signal based on the time slot corresponding to each receive transducer electronic signal,
retrieve the binary data packet for each receive channel contained in the receive signal, and
generate sonar data corresponding to the analog voltage of the multiplexer signal from the binary data packets for each receive channel;
wherein the number of receive channels is greater than the number of analog to digital converters.

10. The marine multibeam sonar device of claim 9, wherein the electronic circuitry of the receiver further comprises a serializer configured to receive the analog to digital converter output and generate a serializer signal that is a conversion of the parallel output of the analog to digital converter to a serial bitstream.

11. The marine multibeam sonar device of claim 10, wherein the electronic circuitry of the receiver further comprises a low voltage differential swing circuit configured to receive the serializer signal and generate the receive signal that is a differential voltage form of the serializer signal.

12. The marine multibeam sonar device of claim 9, further comprising:
a transmitter including a plurality of transmit channel circuits, each connected to one of a plurality of transmit transducers, wherein each transmit channel circuit is configured to receive a transmit transducer electronic signal and the transmit transducers are oriented in a linear array that is configured to form a transmit acoustic beam,
and the processing element is further configured to generate the transmit transducer electronic signals, each including a binary bitstream.

13. The marine multibeam sonar device of claim 12, wherein each binary bitstream is formed from a single bitstream pattern that is stored in the memory element.

14. The marine multibeam sonar device of claim 13, wherein the processing element communicates the bitstream pattern to each transmit channel circuit with an offset determined by a position of the associated transmit transducer in the array, the offset being a point in the pattern at which the bitstream is started.

15. The marine multibeam sonar device of claim 14, wherein each bitstream pattern forms a periodic signal with a phase that is adjusted to control an angle at which the transmit beam is generated and the processing element is further configured to adjust the phase by adjusting the offset for each transmit channel circuit.

16. The marine multibeam sonar device of claim 9, wherein the cutoff frequency of the low pass filter is related to the rate at which the analog to digital converter samples the multiplexer signal.

* * * * *